United States Patent
Wang

(10) Patent No.: US 9,924,364 B2
(45) Date of Patent: Mar. 20, 2018

(54) USER MANAGEMENT METHOD OF SHARED NETWORK, AND CORRESPONDING DEVICE AND SYSTEM

(71) Applicant: Huawei Technologies Co., Ltd., Shenzhen (CN)

(72) Inventor: Shuo Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/399,926

(22) Filed: Jan. 6, 2017

(65) Prior Publication Data

US 2017/0118654 A1    Apr. 27, 2017

Related U.S. Application Data

(63) Continuation of application No. PCT/CN2014/081840, filed on Jul. 8, 2014.

(51) Int. Cl.
*H04W 12/08* (2009.01)
*H04L 29/08* (2006.01)
(Continued)

(52) U.S. Cl.
CPC ......... *H04W 12/08* (2013.01); *H04L 67/306* (2013.01); *H04M 17/10* (2013.01); *H04W 48/16* (2013.01)

(58) Field of Classification Search
CPC .... H04W 12/08; H04W 48/16; H04L 67/306; H04M 17/10
See application file for complete search history.

(56) References Cited

U.S. PATENT DOCUMENTS

| | | | | |
|---|---|---|---|---|
| 7,512,104 | B2 * | 3/2009 | Bjelland | H04W 76/062 370/331 |
| 2008/0259873 | A1 * | 10/2008 | Ahmavaara | H04W 36/0033 370/331 |

(Continued)

FOREIGN PATENT DOCUMENTS

| | | |
|---|---|---|
| CN | 101572862 A | 11/2009 |
| CN | 101938850 A | 1/2011 |

(Continued)

OTHER PUBLICATIONS

Machine Translation and Abstract of Chinese Publication No. CN101938850, Jan. 5, 2011, 16 pages.

(Continued)

*Primary Examiner* — Mehmood B Khan
(74) *Attorney, Agent, or Firm* — Conley Rose, P.C.

(57) ABSTRACT

A user management method of a shared network, where the method includes acquiring user management information from a user access management device, where the user management information includes identification information of a participant operator and invalid user information/valid user information, the invalid user information is used to indicate a user equipment that has been detached from a network of the participant operator but a user context is still retained in the user access management device, and the valid user information is used to indicate a user equipment attached to the network of the participant operator, and updating access user information of the participant operator according to the user management information. In addition, another user management method of a shared network, and a corresponding device and system are further provided.

14 Claims, 6 Drawing Sheets

(51) Int. Cl.
*H04M 17/00* (2006.01)
*H04W 48/16* (2009.01)

(56) References Cited

U.S. PATENT DOCUMENTS

| | | | | |
|---|---|---|---|---|
| 2010/0323700 | A1* | 12/2010 | Bachmann | H04W 36/0066 455/436 |
| 2012/0246325 | A1* | 9/2012 | Pancorbo Marcos | H04L 63/102 709/227 |
| 2015/0117408 | A1* | 4/2015 | Kedalagudde | H04W 36/0027 370/331 |
| 2015/0237495 | A1* | 8/2015 | Zhang | H04W 8/186 455/422.1 |
| 2017/0142762 | A1* | 5/2017 | Kedalagudde | H04W 76/022 |

FOREIGN PATENT DOCUMENTS

| | | |
|---|---|---|
| CN | 102930434 A | 2/2013 |
| CN | 103229547 A | 7/2013 |
| CN | 103796190 A | 5/2014 |
| EP | 2509374 A1 | 10/2012 |
| EP | 2911427 A1 | 8/2015 |
| WO | 2013166230 A2 | 11/2013 |
| WO | 2014004965 A1 | 1/2014 |

OTHER PUBLICATIONS

Machine Translation and Abstract of Chinese Publication No. CN102930434, Feb. 13, 2013, 7 pages.
Foreign Communication From a Counterpart Application, European Application No. 14897406.6, Extended European Search Report dated May 10, 2017, 11 pages.
Foreign Communication From a Counterpart Application, PCT Application No. PCT/CN2014/081840, English Translation of International Search Report dated Apr. 13, 2015, 3 pages.
Foreign Communication From a Counterpart Application, PCT Application No. PCT/CN2014/081840, English Translation of Written Opinion dated Apr. 9, 2015, 12 pages.

* cited by examiner

USER MANAGEMENT METHOD OF SHARED NETWORK, AND CORRESPONDING DEVICE AND SYSTEM

CROSS-REFERENCE TO RELATED APPLICATIONS

This application is a continuation of International Patent Application No. PCT/CN2014/081840 filed on Jul. 8, 2014, the disclosure of which is hereby incorporated by reference in its entirety.

TECHNICAL FIELD

The present disclosure relates to the field of communications technologies, and in particular, to a user management method of a shared network, and a corresponding device and system.

BACKGROUND

Network sharing refers to a network operating mode in which multiple different operators use a same mobile network. Compared with a case in which a conventional mobile network operator (MNO) needs to input huge amounts of money to build and upgrade a network, in this mode, costs input by an operator can be greatly reduced.

The network sharing may be network sharing between operators, or may be network sharing between an operator and a mobile virtual network operator (MVNO). The MVNO generally refers to an operator that is not licensed or whose development scale is limited, and therefore needs to use a network of an existing basic MNO to cultivate users of the operator, and provide services to the users. A licensed MNO may also rent a network of another MNO to cultivate users of the licensed MNO and provide services. Such a licensed MNO may also be considered as a MVNO. With enhancement of a network sharing capability, a network of one MNO may serve multiple participant MNO (PMNO) (that is, basic mobile operators or MVNOs). The MNO serving the multiple participant operators, that is, a primary operator, needs to manage and control network resources for each participant operator. For example, the MNO allocates different radio access resources, different maximum user quantities, different maximum bearer/Packet Data Protocol (PDP) resources, and the like to different participant operators in order to ensure that there are sufficient network resources available for all the participant operators that are served by the MNO. In other approaches, a primary operator generally uses a home subscriber server (HSS) to collect statistics about and monitor a total quantity of access users of each participant operator in order to avoid an infringement on interests of the primary operator because a quantity of users of a participant operator that access a network of the operator exceeds a total quantity of subscribed access users.

During research and practice of other approaches, it is found that that in other approaches, when a user equipment executes a detach procedure, even though a mobility management entity (MME) has been detached from the user equipment, the HSS cannot know the detachment. Therefore, in the network, a quantity of actual access users of a participant operator may be less than a quantity of access users of a related participant operator that is obtained through statistics collection by the HSS, affecting accuracy of controlling the quantity of the access users, even affecting normal access of a user, and reducing network performance.

SUMMARY

Embodiments of the present disclosure provide a user management method of a shared network, and a corresponding device and system, which can improve accuracy of controlling a quantity of access users, and improve network performance.

According to a first aspect, an embodiment of the present disclosure provides a user information management device of a shared network, including an acquiring unit configured to acquire user management information from a user access management device, where the user management information includes identification information of a participant operator and invalid user information/valid user information, the invalid user information is used to indicate a user equipment that has been detached from a network of the participant operator but a user context of the user equipment is still retained in the user access management device, and the valid user information is used to indicate a user equipment attached to the network of the participant operator, and an updating unit configured to update access user information of the participant operator according to the user management information.

With reference to the first aspect, in a first possible implementation manner, the acquiring unit includes a first receiving subunit, a first determining subunit, and a first sending subunit, where the first receiving subunit is configured to receive an authentication request that is initiated by the user access management device according to an access request sent by a user equipment, where the authentication request carries the identification information of the participant operator. The first determining subunit is configured to determine, according to the identification information of the participant operator, the participant operator to which the user equipment belongs, and determine a quantity of access users of the participant operator. The first sending subunit is configured to send a notification to multiple user access management devices that carry a service of the participant operator when the quantity of the access users exceeds a preset threshold, where the notification instructs the user access management device to report the user management information, and the first receiving subunit is further configured to receive the user management information sent by the multiple user access management devices.

With reference to the first aspect, in a second possible implementation manner, the acquiring unit includes a second receiving subunit, a second determining subunit, and a second sending subunit, where the second receiving subunit is configured to receive an authentication request that is initiated by the user access management device according to an access request sent by a user equipment, where the authentication request carries the identification information of the participant operator. The second determining subunit is configured to determine, according to the identification information of the participant operator, the participant operator to which the user equipment belongs, and determine a quantity of access users of the participant operator. The second sending subunit is configured to send an authentication response message to the user access management device, where the authentication response message carries the quantity of the access users, and the second receiving subunit is further configured to receive the user management information sent by the user access management device, where the user management information is sent by the user access management device when the quantity of the access users exceeds a preset threshold.

With reference to the first aspect or the first or the second possible implementation manner of the first aspect, in a third possible implementation manner, the updating unit is further configured to delete, from an access user information list of the participant operator, a record of access user information corresponding to the invalid user information, where the access user information list of the participant operator is used to record access user information of the participant operator.

With reference to the first aspect or the first or the second possible implementation manner of the first aspect, in a fourth possible implementation manner, the updating unit is further configured to delete, from an access user information list of the participant operator, a record other than access user information corresponding to the valid user information, where the access user information list of the participant operator is used to record access user information of the participant operator.

According to a second aspect, an embodiment of the present disclosure further provides a user access management device, including a first receiving unit configured to receive an access request sent by a user equipment, where the access request carries a user identifier, a first determining unit configured to determine, according to the user identifier, a participant operator to which the user equipment belongs, and a first sending unit configured to send an authentication request to a user information management device according to the access request, where the authentication request carries identification information of the participant operator such that the user information management device determines, according to the identification information of the participant operator, the participant operator to which the user equipment belongs, and determines a quantity of access users of the participant operator, where the first receiving unit is further configured to receive a notification that is sent by the user information management device when the user information management device determines that the quantity of the access users exceeds a preset threshold, where the notification instructs the access management device to report user management information, and the first sending unit is further configured to send the user management information to the user information management device such that the user information management device updates access user information of the participant operator according to the user management information, where the user management information includes the identification information of the participant operator and invalid user information/valid user information, the invalid user information is used to indicate a user equipment that has been detached from a network of the participant operator but a user context of the user equipment is still retained in the user access management device, and the valid user information is used to indicate a user equipment attached to the network of the participant operator.

According to a third aspect, an embodiment of the present disclosure further provides a user access management device, including a second receiving unit configured to receive an access request sent by a user equipment, where the access request carries a user identifier, a second determining unit configured to determine, according to the user identifier, a participant operator to which the user equipment belongs, and a second sending unit configured to send an authentication request to a user information management device according to the access request, where the authentication request carries identification information of the participant operator such that the user information management device determines, according to the identification information of the participant operator, the participant operator to which the user equipment belongs, and determines a quantity of access users of the participant operator, where the second receiving unit is further configured to receive an authentication response message returned by the user information management device, where the authentication response message carries the quantity of the access users, and the second sending unit is further configured to send user management information to the user information management device when the quantity of the access users exceeds a preset threshold such that the user information management device updates access user information of the participant operator according to the user management information, where the user management information includes the identification information of the participant operator and invalid user information/valid user information, the invalid user information is used to indicate a user equipment that has been detached from a network of the participant operator but a user context of the user equipment is still retained in the user access management device, and the valid user information is used to indicate a user equipment attached to the network of the participant operator.

According to a fourth aspect, an embodiment of the present disclosure further provides a communications system, including any user information management device of a shared network according to the embodiments of the present disclosure.

With reference to the fourth aspect, in a first possible implementation manner, the communications system further includes any user access management device according to the embodiments of the present disclosure.

According to a fifth aspect, an embodiment of the present disclosure further provides a user management method of a shared network, including acquiring user management information from a user access management device, where the user management information includes identification information of a participant operator and invalid user information/valid user information, the invalid user information is used to indicate a user equipment that has been detached from a network of the participant operator but a user context of the user equipment is still retained in the user access management device, and the valid user information is used to indicate a user equipment attached to the network of the participant operator, and updating access user information of the participant operator according to the user management information.

With reference to the fifth aspect, in a first possible implementation manner, acquiring user management information from a user access management device includes receiving an authentication request that is initiated by the user access management device according to an access request sent by a user equipment, where the authentication request carries the identification information of the participant operator, determining, according to the identification information of the participant operator, the participant operator to which the user equipment belongs, and determining a quantity of access users of the participant operator, sending a notification to multiple access management devices that carry a service of the participant operator when the quantity of the access users exceeds a preset threshold, where the notification instructs the access management device to report the user management information, and receiving the user management information sent by the multiple access management devices.

With reference to the fifth aspect, in a second possible implementation manner, acquiring user management information from a user access management device includes receiving an authentication request that is initiated by the user access management device according to an access request sent by a user equipment, where the authentication request carries the identification information of the participant operator, determining, according to the identification information of the participant operator, the participant operator to which the user equipment belongs, and determining a quantity of access users of the participant operator, sending an authentication response message to the user access management device, where the authentication response message carries the quantity of the access users, and receiving the user management information sent by the access management device, where the user management information is sent by the access management device when the quantity of the access users exceeds a preset threshold.

With reference to the fifth aspect or the first or the second possible implementation manner of the fifth aspect, in a third possible implementation manner, updating access user information of the participant operator according to the user management information includes deleting, from an access user information list of the participant operator, a record of access user information corresponding to the invalid user information, where the access user information list of the participant operator is used to record access user information of the participant operator, or deleting, from an access user information list of the participant operator, a record other than access user information corresponding to the valid user information, where the access user information list of the participant operator is used to record access user information of the participant operator.

According to a sixth aspect, an embodiment of the present disclosure further provides a user management method of a shared network, including receiving an access request sent by a user equipment, where the access request carries a user identifier, determining, according to the user identifier, a participant operator to which the user equipment belongs, sending an authentication request to a user information management device according to the access request, where the authentication request carries identification information of the participant operator such that the user information management device determines, according to the identification information of the participant operator, the participant operator to which the user equipment belongs, and determines a quantity of access users of the participant operator, receiving a notification that is sent by the user information management device when the user information management device determines that the quantity of the access users exceeds a preset threshold, where the notification instructs an access management device to report user management information, and sending the user management information to the user information management device such that the user information management device updates access user information of the participant operator according to the user management information.

According to a seventh aspect, an embodiment of the present disclosure further provides a user management method of a shared network, including receiving an access request sent by a user equipment, where the access request carries a user identifier, determining, according to the user identifier, a participant operator to which the user equipment belongs, sending an authentication request to a user information management device according to the access request, where the authentication request carries identification information of the participant operator such that the user information management device determines, according to the identification information of the participant operator, the participant operator to which the user equipment belongs, and determines a quantity of access users of the participant operator, receiving an authentication response message returned by the user information management device, where the authentication response message carries the quantity of the access users, and sending user management information to the user information management device when the quantity of the access users exceeds a preset threshold such that the user information management device updates access user information of the participant operator according to the user management information, where the user management information includes the identification information of the participant operator and invalid user information/valid user information, the invalid user information is used to indicate a user equipment that has been detached from a network of the participant operator but a user context of the user equipment is still retained in the user access management device, and the valid user information is used to indicate a user equipment attached to the network of the participant operator.

According to an eighth aspect, an embodiment of the present disclosure further provides a user information management device of a shared network, including a memory configured to store data, a transceiving interface configured to send and receive data, and a processor, where the processor is configured to acquire user management information from a user access management device, where the user management information includes identification information of a participant operator and invalid user information/valid user information, the invalid user information is used to indicate a user equipment that has been detached from a network of the participant operator but a user context of the user equipment is still retained in the user access management device, and the valid user information is used to indicate a user equipment attached to the network of the participant operator, and update access user information of the participant operator according to the user management information.

With reference to the eighth aspect, in a first possible implementation manner, the processor is further configured to receive, using the transceiving interface, an authentication request that is initiated by the user access management device according to an access request sent by a user equipment, where the authentication request carries the identification information of the participant operator, determine, according to the identification information of the participant operator, the participant operator to which the user equipment belongs, and determine a quantity of access users of the participant operator, send, using the transceiving interface, a notification to multiple access management devices that carry a service of the participant operator when the quantity of the access users exceeds a preset threshold, where the notification instructs the access management device to report the user management information, and receive, using the transceiving interface, the user management information sent by the multiple access management devices.

With reference to the eighth aspect, in a second possible implementation manner, the processor is further configured to receive, using the transceiving interface, an authentication request that is initiated by the user access management device according to an access request sent by a user equipment, where the authentication request carries the identification information of the participant operator, determine, according to the identification information of the participant operator, the participant operator to which the user equipment belongs, and determine a quantity of access users of the participant operator, send, using the transceiving interface, an authentication response message to the user access management device, where the authentication response message carries the quantity of the access users, and receive, using the transceiving interface, the user management information sent by the access management device, where the user management information is sent by the access management device when the quantity of the access users exceeds a preset threshold.

With reference to the eighth aspect or the first or the second possible implementation manner of the eighth aspect, in a third possible implementation manner, the processor is further configured to delete, from an access user information list of the participant operator, a record of access user information corresponding to the invalid user information, where the access user information list of the participant operator is used to record access user information of the participant operator, or the processor is further configured to delete, from an access user information list of the participant operator, a record other than access user information corresponding to the valid user information, where the access user information list of the participant operator is used to record access user information of the participant operator.

In the embodiments of the present disclosure, a user information management device acquires user management information from a user access management device, where the user management information includes identification information of a participant operator and invalid user information/valid user information, and then updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

The embodiments of the present disclosure provide a user management method of a shared network, and a corresponding device and system, which are separately described in detail below.

To better describe the embodiments of the present disclosure, the following briefly describes a network structure of the shared network.

Figure 1A:
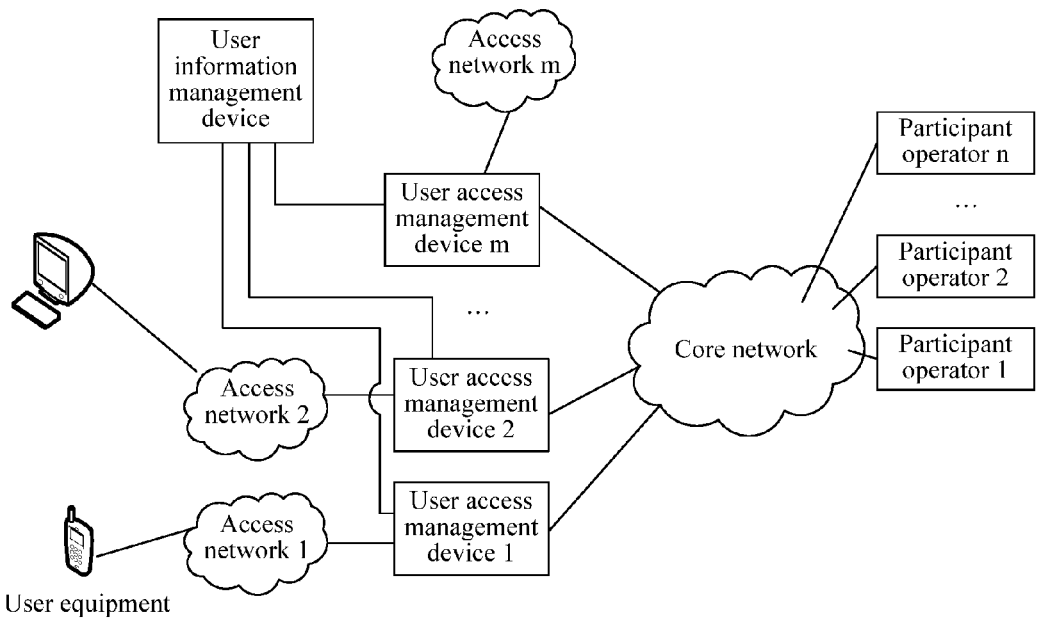
FIG. 1A is a schematic network structure diagram of a shared network according to an embodiment of the present disclosure.

As shown in FIG. 1A, multiple participant operators, for example, a participant operator 1, a participant operator 2, . . . , and a participant operator n, exist in the shared network. The multiple operators serve a user equipment using a core network. The user equipment may access the core network using an access network. The access network may have multiple network structures, for example, an evolved universal terrestrial radio access network (E-UTRAN), an Enhanced Data rate for Global System for Mobile communications Evolution radio access network (also known as GSM EDGE Radio Access Network (GERAN)), or a universal mobile communications network terrestrial radio access network (also known as UMTS Territorial Radio Access Network (UTRAN)). The shared network may further include multiple user access management devices, for example, a user access management device 1, a user access management device 2, . . . , and a user access management device m. The multiple user access management devices may be MMEs, which are mainly used for mobility management of a control plane, such as user context management, mobile state management, or user temporary identity allocation. Certainly, the user access management device may be another device. For example, in a roaming scenario in a shared network, if a participant operator deploys a roaming support system in a visited location, where the roaming support system may also be referred to as a customer relationship management (CRM) system, the user access management device may be a CRM. In addition to the user access management device, the shared network may further include a user information management device, such as an HSS, which is mainly used to store user subscription information. One user information management device may correspond to multiple user access management devices. After receiving an access request from a user equipment, a user access management device may send an authentication request to the user information management device according to the received access request such that the user information management device performs authentication. Moreover, the user information management device may further control access of a user of each participant operator according to a limit value of a quantity of access users that subscribe to each participant operator and a primary operator. It should be noted that for ease of description, multiple network elements are omitted in FIG. 1A. It should be understood that in an actual network structure, in addition to network elements shown in FIG. 1A, another network element, such as an access gateway, a serving gateway, or a packet data gateway, may also be included.

Based on a structure of the foregoing shared network, detailed descriptions are provided below.

Embodiment 1

Figure 1B:
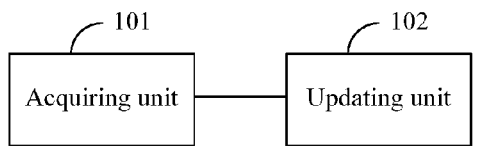
FIG. 1B is a schematic structural diagram of a user information management device of a shared network according to an embodiment of the present disclosure.

As shown in FIG. 1B, a user management apparatus of a shared network includes an acquiring unit 101 and an updating unit 102.

The acquiring unit 101 is configured to acquire user management information from a user access management device.

The user management information includes identification information of a participant operator and invalid user information/valid user information, or other information. That is, the user management information includes the identification information of the participant operator and the invalid user information, or other information, or the user management information includes the identification information of the participant operator and the valid user information, or other information.

The invalid user information is used to indicate a user equipment that has been detached from a network of the participant operator but a user context of the user equipment is still retained in the user access management device, and the valid user information is used to indicate a user equipment attached to the network of the participant operator.

The identification information of the participant operator may include information such as a participant operator identifier (PMNO ID) or an access point name (APN).

The updating unit 102 is configured to update access user information of the participant operator according to the user management information.

For example, the updating unit 102 may determine the corresponding participant operator according to the identification information of the participant operator that is carried in the user management information, and then update the access user information of the determined participant operator according to the invalid user information or the valid user information.

The user information management device may store and maintain the access user information in multiple forms, for example, in a form of a data table, or using another data structure. If the access user information is in the form of a data table, the user information management device may delete, from the data table, a record of access user information corresponding to the invalid user information, or delete, from the data table, a record other than access user information corresponding to the valid user information, and so on. That is the updating unit 102 may be further configured to delete, from an access user information list of the participant operator, a record of access user information corresponding to the invalid user information, or the updating unit 102 may be further configured to delete, from an access user information list of the participant operator, a record other than access user information corresponding to the valid user information.

For ease of description, in this embodiment of the present disclosure, the data table is referred to as the access user information list, and the access user information list may be used to record the access user information of the participant operator.

The acquiring unit 101 may acquire the user management information in multiple manners. For example, the user information management device may instruct the user access management device to report the user management information when perceiving that a quantity of access users exceeds a preset threshold, or the user information management device may inform the user access management device of a quantity of access users, and the user access management device reports the user management information to the user information management device when perceiving that the quantity of the access users exceeds a preset threshold. The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein. That is, the acquiring unit 101 may include either of the following structures.

(1) A first manner: The acquiring unit 101 may include a first receiving subunit (not shown), a first determining subunit (not shown), and a first sending subunit (not shown), which are as follows.

The first receiving subunit may be configured to receive an authentication request that is initiated by the user access management device according to an access request sent by a user equipment. The authentication request carries the identification information of the participant operator, or other information.

The first determining subunit may be configured to determine, according to the identification information of the participant operator, the participant operator to which the user equipment belongs, and determine a quantity of access users of the participant operator.

The first sending subunit may be configured to send a notification to multiple access management devices that carry a service of the participant operator when the quantity of the access users exceeds a preset threshold. The notification instructs the access management device to report the user management information or other information.

The first receiving subunit may further be configured to receive the user management information sent by the multiple access management devices.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

(2) A second manner: The acquiring unit 101 may include a second receiving subunit (not shown), a second determining subunit (not shown), and a second sending subunit (not shown), which are as follows.

The second receiving subunit is configured to receive an authentication request that is initiated by the user access management device according to an access request sent by a user equipment. The authentication request carries the identification information of the participant operator, or other information.

The second determining subunit is configured to determine, according to the identification information of the participant operator, the participant operator to which the user equipment belongs, and determine a quantity of access users of the participant operator.

The second sending subunit is configured to send an authentication response message to the user access management device, where the authentication response message carries the quantity of the access users, or other information.

The second receiving subunit is further configured to receive the user management information sent by the access management device. The user management information is sent by the access management device when the quantity of the access users exceeds a preset threshold.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

The user information management device may be a device such as an HSS.

In a specific implementation, the foregoing units may be implemented as independent entities, or may be combined arbitrarily, or may be implemented as a same entity or several entities, which is not described in detail herein.

It can be learned from the above that in this embodiment, the acquiring unit 101 of the user information management device may acquire user management information from the user access management device, where the user management information includes identification information of a participant operator and invalid user information/valid user information, and then the updating unit 102 updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 2

Figure 2:
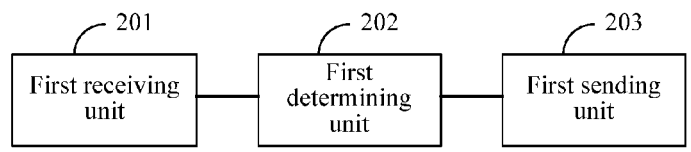
FIG. 2 is a schematic structural diagram of a user access management device of a shared network according to an embodiment of the present disclosure.

Correspondingly, this embodiment of the present disclosure further provides a user access management device. As shown in FIG. 2, the user access management device includes a first receiving unit 201, a first determining unit 202, and a first sending unit 203.

The first receiving unit 201 is configured to receive an access request sent by a user equipment, where the access request carries a user identifier.

The user identifier may be an international mobile subscriber identity (IMSI), a mobile subscriber identification number (MSIN), or the like. An identifier such as an identifier of a corresponding participant operator can be found according to the user identifier, and accordingly, the participant operator to which the user equipment belongs is determined.

The access request may be represented in multiple message forms, for example, may be an attach request.

The first determining unit 202 is configured to determine, according to the user identifier, the participant operator to which the user equipment belongs.

The first sending unit 203 is configured to send an authentication request to a user information management device according to the access request, where the authentication request carries identification information of the participant operator such that the user information management device determines, according to the identification information of the participant operator, the participant operator to which the user equipment belongs, and determines a quantity of access users of the participant operator.

The first receiving unit 201 is further configured to receive a notification that is sent by the user information management device when the user information management device determines that the quantity of the access users exceeds a preset threshold. The notification instructs the access management device to report user management information.

The first sending unit 203 is further configured to send the user management information to the user information management device such that the user information management device updates access user information of the participant operator according to the user management information.

The user management information includes the identification information of the participant operator and invalid user information/valid user information, or other information. That is, the user management information includes the identification information of the participant operator and the invalid user information, or other information, or the user management information includes the identification information of the participant operator and the valid user information, or other information.

The invalid user information is used to indicate a user equipment that has been detached from a network of the participant operator but a user context of the user equipment is still retained in the user access management device, and the valid user information is used to indicate a user equipment attached to the network of the participant operator.

The user access management device may be a device such as an MME or a CRM.

In a specific implementation, the foregoing units may be implemented as independent entities, or may be combined arbitrarily, or may be implemented as a same entity or several entities, which is not described in detail herein.

It can be learned from the above that in this embodiment, a user access management device provides user management information to a user access management device, where the user management information includes identification information of a participant operator and invalid user information/valid user information such that the user information management device updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 3

Correspondingly, this embodiment of the present disclosure further provides another user access management device. In Embodiment 2, the user information management device mainly perceives whether a quantity of access users exceeds a preset threshold in order to determine whether user management information needs to be acquired. Different from Embodiment 2, in this embodiment, a description is provided using an example in which the user access management device perceives whether a quantity of access users exceeds a preset threshold.

Figure 3:
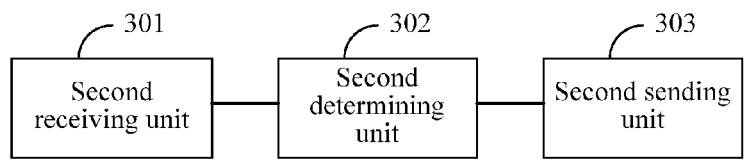
FIG. 3 is a schematic structural diagram of a user access management device of a shared network according to an embodiment of the present disclosure.

As shown in FIG. 3, the user access management device includes a second receiving unit 301, a second determining unit 302, and a second sending unit 303.

The second receiving unit 301 is configured to receive an access request sent by a user equipment, where the access request carries a user identifier.

The user identifier may be an IMSI, an MSIN, or the like. An identifier such as an identifier of a corresponding participant operator can be found according to the user identifier, and accordingly, the participant operator to which the user equipment belongs is determined.

The access request may be further represented in multiple message forms, for example, may be further an attach request.

The second determining unit 302 is configured to determine, according to the user identifier, the participant operator to which the user equipment belongs.

The second sending unit 303 is configured to send an authentication request to a user information management device according to the access request, where the authentication request carries identification information of the participant operator such that the user information management device determines, according to the identification information of the participant operator, the participant operator to which the user equipment belongs, and determines a quantity of access users of the participant operator.

The authentication request may be sent in multiple message forms. For example, the authentication request may be a location update request, which is not described in detail herein.

The second receiving unit 301 is further configured to receive an authentication response message returned by the user information management device, where the authentication response message carries the quantity of the access users.

If the authentication request is a location update request, in this case, the authentication response message is a location update response, which is not described in detail herein.

The second sending unit 303 is further configured to send user management information to the user information management device when the quantity of the access users exceeds a preset threshold such that the user information management device may update access user information of the participant operator according to the user management information.

The user management information includes the identification information of the participant operator and invalid user information/valid user information, or other information. That is, the user management information includes the identification information of the participant operator and the invalid user information, or other information, or the user management information includes the identification information of the participant operator and the valid user information, or other information.

The invalid user information is used to indicate a user equipment that has been detached from a network of the participant operator but a user context of the user equipment is still retained in the user access management device, and the valid user information is used to indicate a user equipment attached to the network of the participant operator.

The user access management device may be a device such as an MME or a CRM.

In a specific implementation, the foregoing units may be implemented as independent entities, or may be combined arbitrarily, or may be implemented as a same entity or several entities, which is not described in detail herein.

It can be learned from the above that in this embodiment, the user access management device may perceive whether a quantity of access users exceeds a threshold, and proactively provide user management information to the user access management device when the quantity of the access users exceeds the threshold, where the user management information includes identification information of a participant operator and invalid user information/valid user information such that the user information management device updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 4

Correspondingly, this embodiment of the present disclosure further provides a communications system, including any user information management device of a shared network that is provided in the embodiments of the present disclosure. For details, refer to Embodiment 1. In addition, the communications system may further include any user access management device that is provided in the embodiments of the present disclosure. For example, the user information management device and the user access management device may be as follows.

The user information management device is configured to acquire user management information from the user access management device, where the user management information includes identification information of a participant operator and invalid user information/valid user information, or other information, and update access user information of the participant operator according to the user management information.

The invalid user information is used to indicate a user equipment that has been detached from a network of the participant operator but a user context of the user equipment is still retained in the user access management device, and the valid user information is used to indicate a user equipment attached to the network of the participant operator.

The user access management device is configured to provide the user management information to the user information management device.

The user information management device may store and maintain the access user information in multiple forms, for example, in a form of a data table, or using another data structure. If the access user information is in the form of a data table, the user information management device may delete, from the data table, a record of access user information corresponding to the invalid user information, or delete, from the data table, a record other than access user information corresponding to the valid user information, and so on. That is the user information management device may be further configured to delete, from an access user information list of the participant operator, a record of access user information corresponding to the invalid user information, or the user information management device may be further configured to delete, from an access user information list of the participant operator, a record other than access user information corresponding to the valid user information.

In addition, the user information management device may acquire the user management information in multiple manners. For example, the user information management device may instruct the user access management device to report the user management information when perceiving that a quantity of access users exceeds a preset threshold, or the user information management device may inform the user access management device of a quantity of access users, and the user access management device reports the user management information to the user information management device when perceiving that the quantity of the access users exceeds a preset threshold. The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein. That is, details may be as follows.

(1) A first manner: The user access management device is configured to receive an access request sent by a user equipment, where the access request carries a user identifier, determine, according to the user identifier, the participant operator to which the user equipment belongs, send an authentication request to the user information management device according to the access request, where the authentication request carries the identification information of the participant operator, receive a notification that is sent by the user information management device when the user information management device determines that a quantity of access users exceeds a preset threshold, and send the user management information to the user information management device according to the notification.

The user information management device is configured to receive the authentication request that is initiated by the user access management device according to the access request sent by the user equipment, determine, according to the identification information of the participant operator, the participant operator to which the user equipment belongs, and determine the quantity of the access users of the participant operator, send the notification to multiple access management devices that carry a service of the participant operator when the quantity of the access users exceeds the preset threshold, where the notification instructs the access management device to report the user management information or other information, receive the user management information sent by the multiple access management devices, and update the access user information of the participant operator according to the user management information.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

(2) A second manner: The user access management device is configured to receive an access request sent by a user equipment, where the access request carries a user identifier, determine, according to the user identifier, the participant operator to which the user equipment belongs, send an authentication request to the user information management device according to the access request, where the authentication request carries the identification information of the participant operator, receive an authentication response message returned by the user information management device, where the authentication response message carries a quantity of access users, and send the user management information to the user information management device when the quantity of the access users exceeds a preset threshold.

The user information management device is configured to receive the authentication request that is initiated by the user access management device according to the access request sent by the user equipment, determine, according to the identification information of the participant operator, the participant operator to which the user equipment belongs, and determine the quantity of the access users of the participant operator, send the authentication response message to the user access management device, where the authentication response message carries the quantity of the access users, or other information, receive the user management information sent by the access management device, and update the access user information of the participant operator according to the user management information.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

It can be learned from the above that, according to the communications system in this embodiment, the user information management device may acquire user management information from the user access management device, where the user management information includes identification information of a participant operator and invalid user information/valid user information, and then update access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 5

In addition, this embodiment of the present disclosure further provides a corresponding method, which is described in detail below.

In this embodiment, a description is provided from a perspective of a user information management device, and the user information management device may be a device such as an HSS.

A user management method of a shared network includes acquiring user management information from a user access management device, where the user management information includes identification information of a participant operator and invalid user information/valid user information, and updating access user information of the participant operator according to the user management information.

Figure 4:
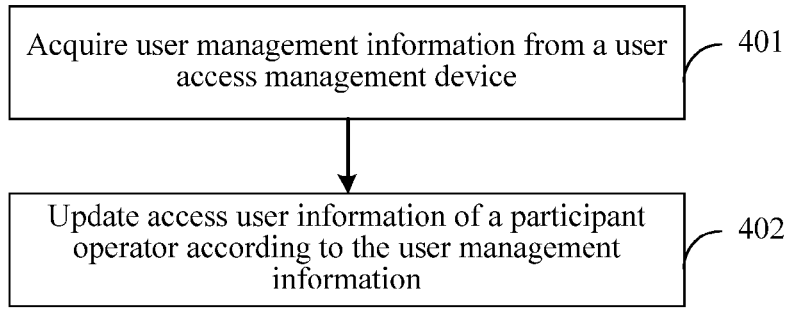
FIG. 4 is a flowchart of a user management method of a shared network according to an embodiment of the present disclosure.

As shown in FIG. 4, the user management method of a shared network may have a specific procedure as follows.

Step 401: Acquire user management information from a user access management device.

The user management information includes identification information of a participant operator and invalid user information/valid user information, or other information. That is, the user management information includes the identification information of the participant operator and the invalid user information, or other information, or the user management information includes the identification information of the participant operator and the valid user information, or other information.

The invalid user information is used to indicate a user equipment that has been detached from a network of the participant operator but a user context of the user equipment is still retained in the user access management device, and the valid user information is used to indicate a user equipment attached to the network of the participant operator.

The identification information of the participant operator may include information such as a PMNO ID or an APN.

The user management information may be acquired in multiple manners. For example, the user information management device may instruct the user access management device to report the user management information when perceiving that a quantity of access users exceeds a preset threshold, or the user information management device may inform the user access management device of a quantity of access users, and the user access management device reports the user management information to the user information management device when perceiving that the quantity of the access users exceeds a preset threshold. The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein. That is, either of the following manners may be used for the step of acquiring user management information from a user access management device.

(1) A first manner is as follows.

A1: Receive an authentication request that is initiated by the user access management device according to an access request sent by a user equipment. The authentication request carries the identification information of the participant operator, or other information.

A2: Determine, according to the identification information of the participant operator, the participant operator to which the user equipment belongs, and determine a quantity of access users of the participant operator.

A3: Send a notification to multiple access management devices that carry a service of the participant operator when the quantity of the access users exceeds a preset threshold. The notification instructs the access management device to report the user management information or other information.

A4: Receive the user management information sent by the multiple access management devices.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

(2) A second manner is as follows.

B1: Receive an authentication request that is initiated by the user access management device according to an access request sent by a user equipment. The authentication request carries the identification information of the participant operator, or other information.

B2: Determine, according to the identification information of the participant operator, the participant operator to which the user equipment belongs, and determine a quantity of access users of the participant operator.

B3: Send an authentication response message to the user access management device, where the authentication response message carries the quantity of the access users, or other information.

B4: Receive the user management information sent by the access management device. The user management information is sent by the access management device when the quantity of the access users exceeds a preset threshold.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

Step 402: Update access user information of the participant operator according to the user management information.

For example, the corresponding participant operator may be determined according to the identification information of the participant operator that is carried in the user management information, and then the access user information of the determined participant operator is updated according to the invalid user information or the valid user information.

The user information management device may store and maintain the access user information in multiple forms, for example, in a form of a data table, or using another data structure. If the access user information is in the form of a data table, the user information management device may delete, from the data table, a record of access user information corresponding to the invalid user information, or delete, from the data table, a record other than access user information corresponding to the valid user information, and so on. That is, the step of updating access user information of the participant operator according to the user management information may be as follows. Deleting, from an access user information list of the participant operator, a record of access user information corresponding to the invalid user information, or deleting, from an access user information list of the participant operator, a record other than access user information corresponding to the valid user information.

It can be learned from the above that in this embodiment, a user information management device may acquire user management information from a user access management device, where the user management information includes identification information of a participant operator and invalid user information/valid user information, and then update access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 6

In this embodiment, a description is provided from a perspective of a user access management device, and the user access management device may be a device such as an MME or a CRM.

Figure 5:
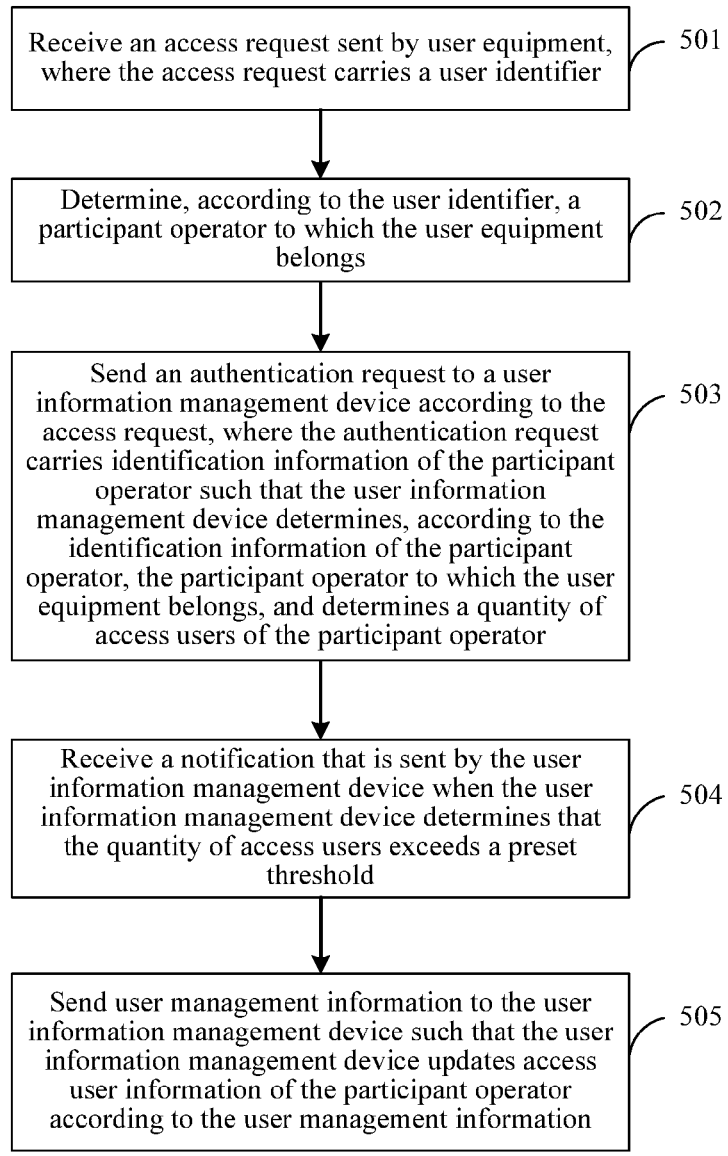
FIG. 5 is another flowchart of a user management method of a shared network according to an embodiment of the present disclosure.

As shown in FIG. 5, a user management method of a shared network may have a specific procedure as follows.

Step 501: Receive an access request sent by a user equipment, where the access request carries a user identifier.

The user identifier may be an IMSI, an MSIN, or the like. An identifier such as an identifier of a corresponding participant operator can be found according to the user identifier, and accordingly, the participant operator to which the user equipment belongs is determined.

The access request may be represented in multiple message forms, for example, may be an attach request.

Step 502: Determine, according to the user identifier, a participant operator to which the user equipment belongs.

Step 503: Send an authentication request to a user information management device according to the access request, where the authentication request carries identification information of the participant operator such that the user information management device determines, according to the identification information of the participant operator, the participant operator to which the user equipment belongs, and determines a quantity of access users of the participant operator.

Step 504: Receive a notification that is sent by the user information management device when the user information management device determines that the quantity of the access users exceeds a preset threshold. The notification instructs the access management device to report user management information.

Step 505: Send user management information to the user information management device such that the user information management device updates access user information of the participant operator according to the user management information, The user management information includes the identification information of the participant operator and invalid user information/valid user information, or other information. That is, the user management information includes the identification information of the participant operator and the invalid user information, or other information, or the user management information includes the identification information of the participant operator and the valid user information, or other information.

The invalid user information is used to indicate a user equipment that has been detached from a network of the participant operator but a user context of the user equipment is still retained in the user access management device, and the valid user information is used to indicate a user equipment attached to the network of the participant operator.

It can be learned from the above that in this embodiment, a user access management device may provide user management information to a user access management device, where the user management information includes identification information of a participant operator and invalid user information/valid user information such that the user information management device updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 7

In Embodiment 6, a user information management device mainly perceives whether a quantity of access users exceeds a preset threshold in order to determine whether user management information needs to be acquired. Different from Embodiment 6, in this embodiment, a description is provided using an example in which a user access management device perceives whether a quantity of access users exceeds a preset threshold. Details are as follows.

Figure 6:
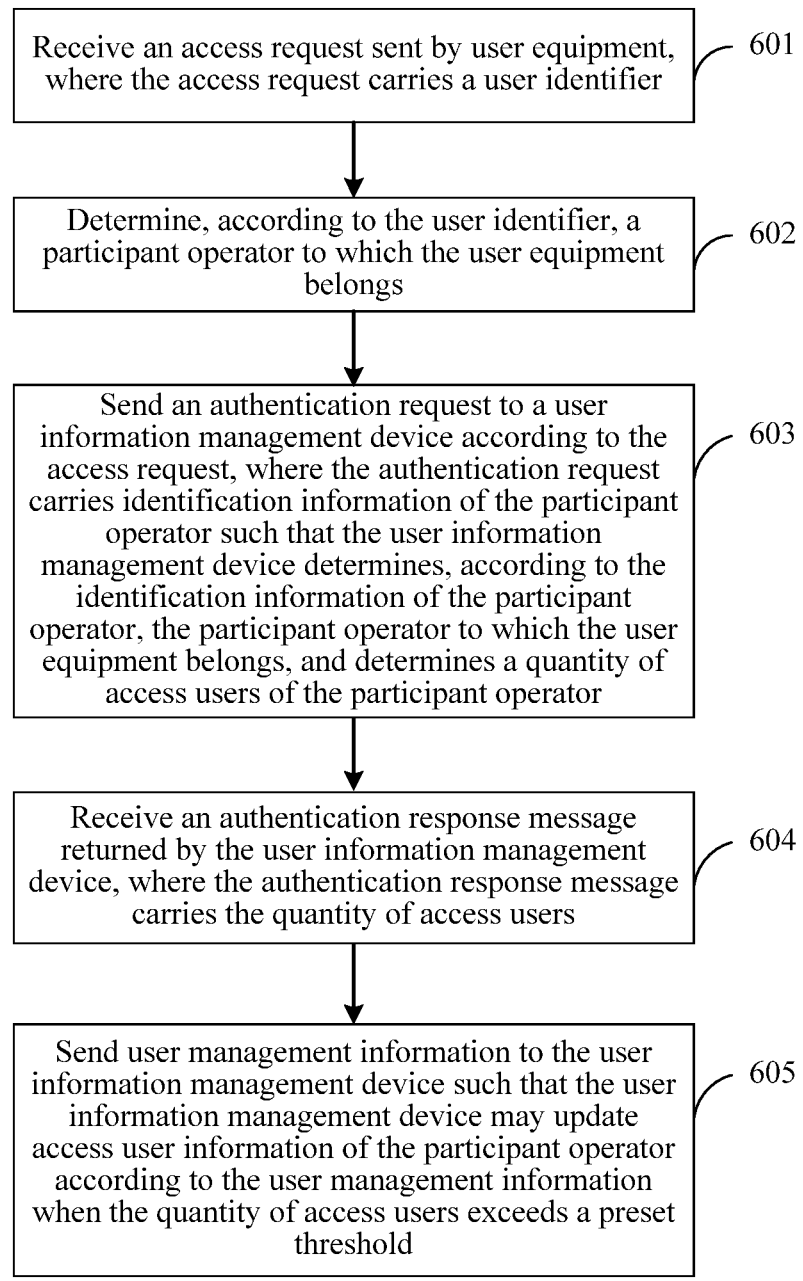
FIG. 6 is still another flowchart of a user management method of a shared network according to an embodiment of the present disclosure.

As shown in FIG. 6, a user management method of a shared network may have a specific procedure as follows.

Step 601: Receive an access request sent by a user equipment, where the access request carries a user identifier.

The user identifier may be an IMSI, an MSIN, or the like. An identifier such as an identifier of a corresponding participant operator can be found according to the user identifier, and accordingly, the participant operator to which the user equipment belongs is determined.

The access request may be represented in multiple message forms, for example, may be an attach request.

Step 602: Determine, according to the user identifier, a participant operator to which the user equipment belongs.

Step 603: Send an authentication request to a user information management device according to the access request, where the authentication request carries identification information of the participant operator such that the user information management device determines, according to the identification information of the participant operator, the participant operator to which the user equipment belongs, and determines a quantity of access users of the participant operator.

The authentication request may be sent in multiple message forms. For example, the authentication request may be a location update request, which is not described in detail herein.

Step 604: Receive an authentication response message returned by the user information management device, where the authentication response message carries the quantity of the access users.

If the authentication request is a location update request, in this case, the authentication response message is a location update response, which is not described in detail herein.

Step 605: Send user management information to the user information management device such that the user information management device may update access user information of the participant operator according to the user management information when the quantity of the access users exceeds a preset threshold.

The user management information includes the identification information of the participant operator and invalid user information/valid user information, or other information. That is, the user management information includes the identification information of the participant operator and the invalid user information, or other information, or the user management information includes the identification information of the participant operator and the valid user information, or other information.

The invalid user information is used to indicate a user equipment that has been detached from a network of the participant operator but a user context of the user equipment is still retained in the user access management device, and the valid user information is used to indicate a user equipment attached to the network of the participant operator.

It can be learned from the above that in this embodiment, a user access management device may perceive whether a quantity of access users exceeds a threshold, and proactively provide user management information to the user access management device when the quantity of the access users exceeds the threshold, where the user management information includes identification information of a participant operator and invalid user information/valid user information such that the user information management device updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

According to the methods described in Embodiment 5, Embodiment 6, and Embodiment 7, examples are used below in Embodiment 8, Embodiment 9, and Embodiment 10 to further provide detailed descriptions.

Embodiment 8

In this embodiment, a description is provided using an example in which a user access management device is an MME, and a user information management device is an HSS.

Figure 7:
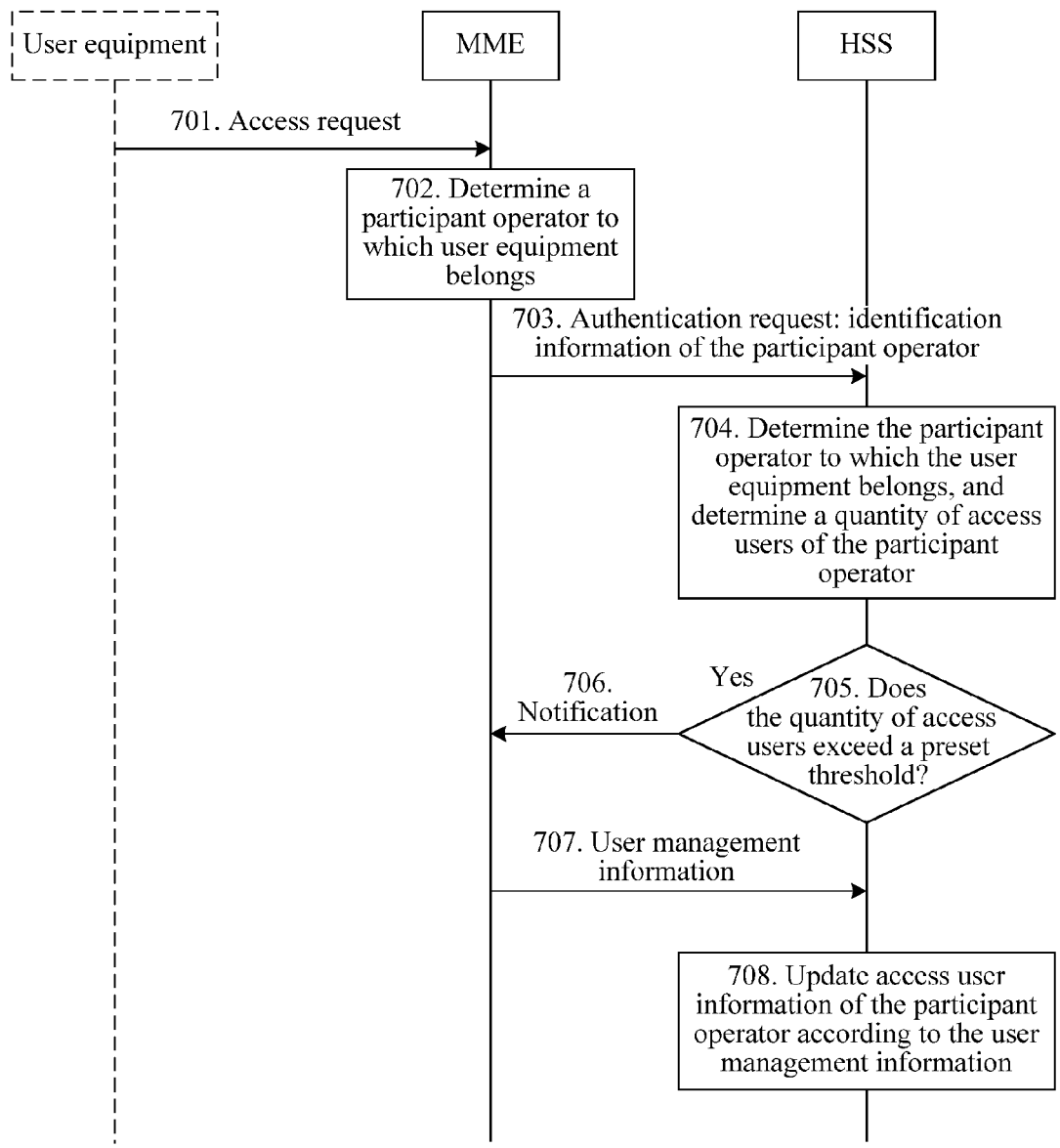
FIG. 7 is still another flowchart of a user management method of a shared network according to an embodiment of the present disclosure.

As shown in FIG. 7, a user management method of a shared network may have a specific procedure as follows.

Step 701: An MME receives an access request sent by a user equipment, where the access request carries a user identifier.

The user identifier may be an IMSI, an MSIN, or the like. An identifier such as an identifier of a corresponding participant operator can be found according to the user identifier, and accordingly, the participant operator to which the user equipment belongs is determined.

The access request may be represented in multiple message forms, for example, may be an attach request.

Step 702: The MME determines, according to the user identifier, a participant operator to which the user equipment belongs, and acquires identification information of the participant operator, or other information.

Step 703: The MME sends an authentication request to an HSS according to the access request. The authentication request carries the identification information of the participant operator, or other information.

Step 704: The HSS determines, according to the identification information of the participant operator, the participant operator to which the user equipment belongs, and determines a quantity of access users of the participant operator after receiving the authentication request.

Step 705: The HSS determines whether the quantity of the access users exceeds a preset threshold, and performs step 706 if the quantity of the access users exceeds a preset threshold, or performs no action if the quantity of the access users does not exceed a preset threshold. Alternatively, the HSS may make, according to an existing procedure, the MME perform authentication, and return an authentication response.

Step 706: The HSS sends a notification to the MME that carries a service of the participant operator when the HSS determines that the quantity of the access users exceeds the preset threshold. The notification instructs the MME to report user management information or other information.

For example, the MME that carries the service of the participant operator may be determined from an MME list. There may be one or more MMEs. Then, the notification is sent to the MME. The notification instructs the MME to report the user management information, or other information.

It should be noted that the notification may be further sent as a "subscription data update message." Because the subscription data update message is based on a user equipment, in this case, a user equipment corresponding to a corresponding MME may be selected at random, and then the subscription data update message is sent to the MME based on the selected user equipment. The subscription data update message includes an identifier of a participant operator to which the user equipment belongs, and instructs the MME to report user management information, or other information. Certainly, the subscription data update message may also be sent in another message form, which is not described in detail herein.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator. When the quantity of the access users exceeds the preset threshold, it represents that resources may have been almost scarce. Therefore, in this case, the quantity of the access users needs to be updated, to determine whether the resources are scarce in order to accurately control access of a user.

Step 707: The MMEs report the user management information to the HSS after receiving the notification.

The user management information includes the identification information of the participant operator and invalid user information/valid user information, or other information, and access user information of the participant operator is updated according to the user management information.

The invalid user information is used to indicate a user equipment that has been detached from a network of the participant operator but a user context of the user equipment is still retained in the user access management device, and the valid user information is used to indicate a user equipment attached to the network of the participant operator. The invalid user information and the valid user information may be represented in a form of multiple data structures. For example, using the invalid user information as an example, the invalid user information may be an information list of invalid access users. The information list may include a user equipment identifier, or may further include information such as a status and a detachment time of the user equipment. Alternatively, the invalid user information may be a quantity of invalid user equipments in the corresponding MME that belongs to the PMNO, or the like. The valid user information is similar to the invalid user information, and is not described in detail herein.

Step 708: The HSS updates access user information of the participant operator according to the user management information sent by the MME.

For example, the HHS may determine the corresponding participant operator according to the identification information of the participant operator that is carried in the user management information, and then update the access user information of the determined participant operator according to the invalid user information or the valid user information. For example, the HHS may delete, from an access user information list of the participant operator, a record of access user information corresponding to the invalid user information if the user management information carries the invalid user information. For another example, the HHS may delete, from an access user information list of the participant operator, a record other than access user information corresponding to the valid user information if the user management information carries the valid user information.

For example, if the invalid user information includes the user equipment identifier, the status and the detachment time of the user equipment, and the like, the user information management device needs to check whether stored access user information matches the received invalid user information, and updates corresponding information about the quantity of the access users if the stored access user information matches the received invalid user information, or neglects this piece of information if the stored access user information does not match the received invalid user information. The user information management device directly updates corresponding information about the quantity of the access users if the invalid user information includes only the quantity of invalid user equipment.

It can be learned from the above that in this embodiment, a user information management device may acquire user management information from a user access management device, where the user management information includes identification information of a participant operator and invalid user information/valid user information, and then update access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 9

Different from Embodiment 8, a roaming scenario is described in detail in this embodiment. In the roaming scenario, the user access management device may be a CRM, and user information management device may be an HHS. Detailed descriptions are provided below using the two devices as an example.

Figure 8:
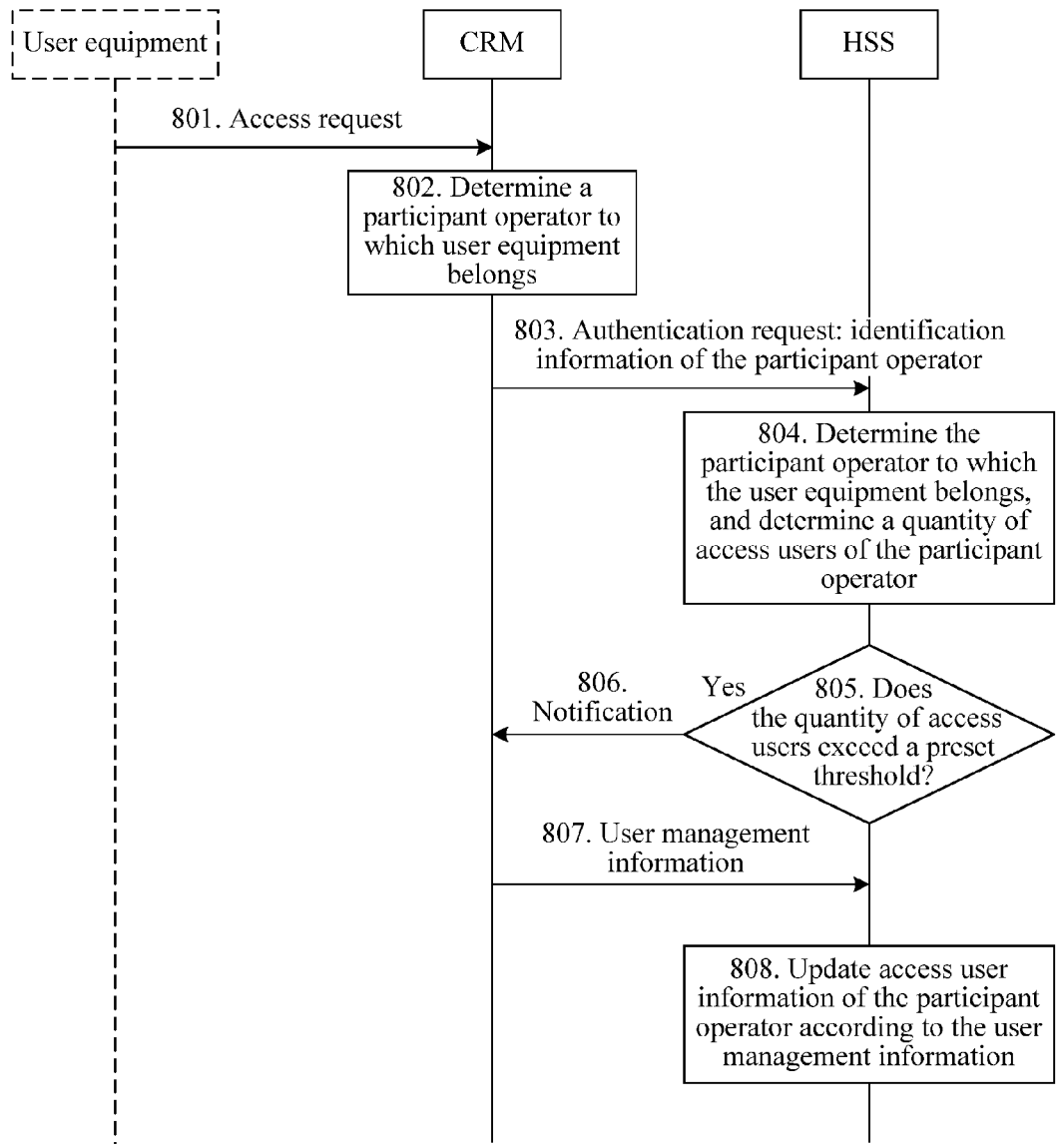
FIG. 8 is still another flowchart of a user management method of a shared network according to an embodiment of the present disclosure.

As shown in FIG. 8, a user management method of a shared network may have a specific procedure as follows.

Step 801: A CRM receives an access request sent by a user equipment, where the access request carries a user identifier.

The user identifier may be an IMSI, an MSIN, or the like. An identifier such as an identifier of a corresponding participant operator can be found according to the user identifier, and accordingly, the participant operator to which the user equipment belongs is determined.

The access request may be represented in multiple message forms, for example, may be an attach request.

Step 802: The CRM determines, according to the user identifier, a participant operator to which the user equipment belongs, and acquires an identifier of the participant operator, or other information.

Step 803: The CRM sends an authentication request to an HSS according to the access request. The authentication request carries identification information of the participant operator, or other information.

Step 804: The HSS determines, according to the identification information of the participant operator, the participant operator to which the user equipment belongs, and determines a quantity of access users of the participant operator after receiving the authentication request.

805: The HSS determines whether the quantity of the access users exceeds a preset threshold, and performs step 806 if the quantity of the access users exceeds a preset threshold, or performs no action if the quantity of the access users does not exceed a preset threshold. Alternatively, the HSS may make, according to an existing procedure, the CRM perform authentication, and return an authentication response.

806: The HSS sends a notification to the CRM that carries a service of the participant operator when the HSS determines that the quantity of the access users exceeds the preset threshold. The notification instructs the CRM to report user management information or other information.

For example, the CRM that carries the service of the participant operator may be determined from an MME list. There may be one or more MMEs. Then, the notification is sent to the CRM. The notification instructs the CRM to report the user management information, or other information.

It should be noted that the notification may be further sent as a "subscription data update message." Because the subscription data update message is based on a user equipment, in this case, a user equipment corresponding to a corresponding CRM may be selected at random, and then the subscription data update message is sent to the CRM based on the selected user equipment. The subscription data update message includes an identifier of a participant operator to which the user equipment belongs, and instructs the CRM to report user management information, or other information. Certainly, the subscription data update message may also be sent in another message form, which is not described in detail herein.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator. When the quantity of the access users exceeds the preset threshold, it represents that resources may have been almost scarce. Therefore, in this case, the quantity of the access users needs to be updated, to determine whether the resources are scarce in order to accurately control access of a user.

Step 807: The CRM reports the user management information to the HSS after receiving the notification.

The user management information includes the identification information of the participant operator and invalid user information/valid user information, or other information, and access user information of the participant operator is updated according to the user management information.

The invalid user information is used to indicate a user equipment that has been detached from a network of the participant operator but a user context of the user equipment is still retained in the user access management device, and the valid user information is used to indicate a user equipment attached to the network of the participant operator.

Step 808: The HHS updates access user information of the participant operator according to the user management information after receiving the user management information sent by the CRM.

For example, the HHS may determine the corresponding participant operator according to the identification information of the participant operator that is carried in the user management information, and then update the access user information of the determined participant operator according to the invalid user information or the valid user information. For example, the HHS may delete, from an access user information list of the participant operator, a record of access user information corresponding to the invalid user information if the user management information carries the invalid user information. For another example, the HHS may delete, from an access user information list of the participant operator, a record other than access user information corresponding to the valid user information if the user management information carries the valid user information.

For example, the user information management device needs to check whether stored access user information matches the received invalid user information if the invalid user information includes a user equipment identifier, a status and a detachment time of the user equipment, and the like, and updates corresponding information about the quantity of the access users if the stored access user information matches the received invalid user information, or neglects this piece of information if the stored access user information does not match the received invalid user information. The user information management device directly updates corresponding information about the quantity of the access users if the invalid user information includes only a quantity of invalid user equipment.

It can be learned from the above that in this embodiment, a user information management device may acquire user management information from a user access management device, where the user management information includes identification information of a participant operator and invalid user information/valid user information, and then update access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 10

In Embodiment 8 and Embodiment 9, a user information management device (an HSS) mainly perceives whether a quantity of access users exceeds a preset threshold in order to determine whether user management information needs to be acquired. Different from Embodiment 8 and Embodiment 9, in this embodiment, descriptions are provided using an example in which a user access management device, such as an MME, perceives whether a quantity of access users exceeds a preset threshold.

Figure 9:
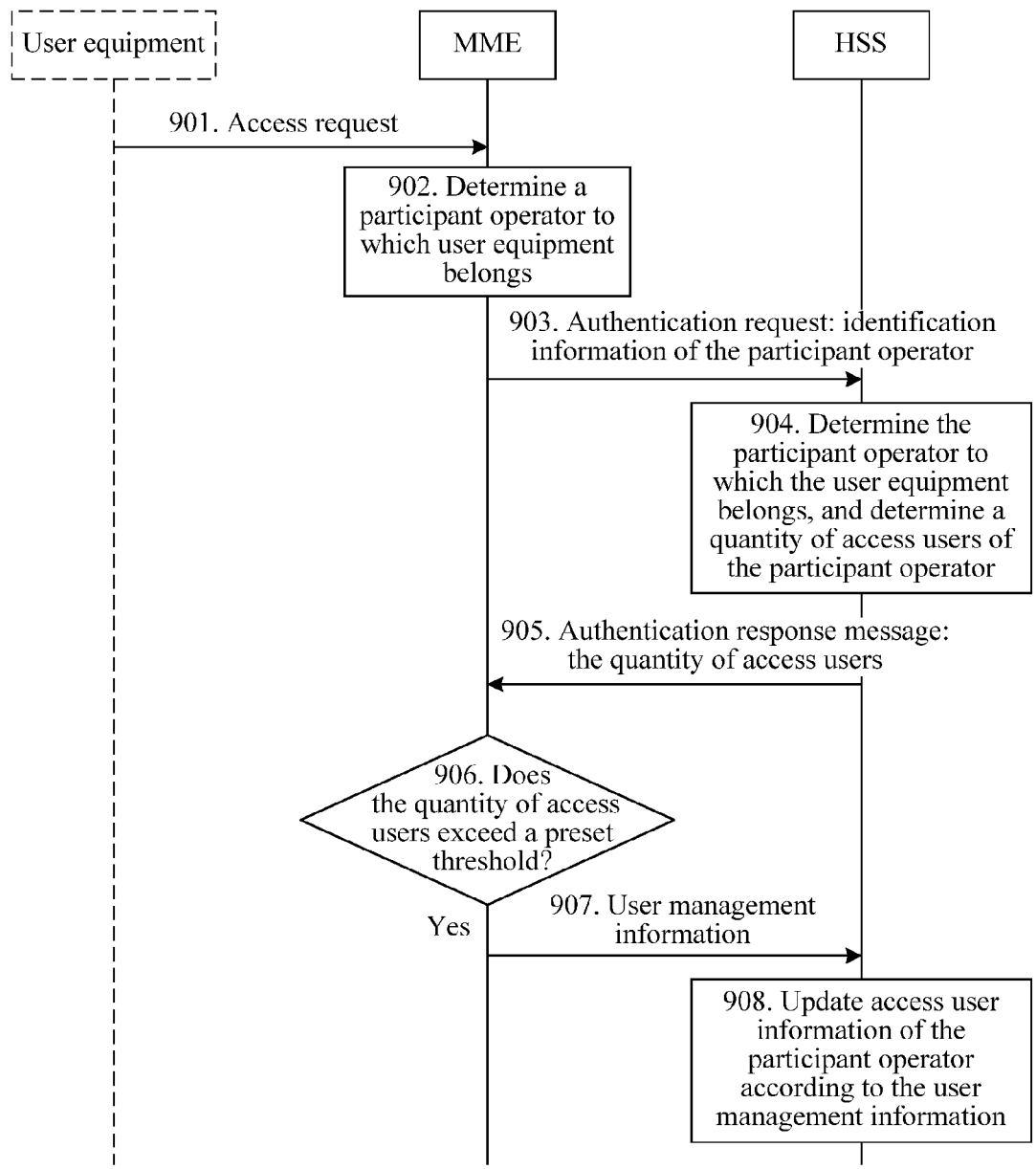
FIG. 9 is still another flowchart of a user management method of a shared network according to an embodiment of the present disclosure.

As shown in FIG. 9, a user management method of a shared network may have a specific procedure as follows.

Step 901: An MME receives an access request sent by a user equipment, where the access request carries a user identifier.

The user identifier may be an IMSI, an MSIN, or the like. An identifier such as an identifier of a corresponding participant operator can be found according to the user identifier, and accordingly, the participant operator to which the user equipment belongs is determined.

The access request may be represented in multiple message forms, for example, may be an attach request.

Step 902: The MME determines, according to the user identifier, a participant operator to which the user equipment belongs, and acquires an identifier of the participant operator, or other information.

Step 903: The MME sends an authentication request to an HSS according to the access request. The authentication request carries identification information of the participant operator, or other information.

Step 904: The HSS determines, according to the identification information of the participant operator, the participant operator to which the user equipment belongs, and determines a quantity of access users of the participant operator after receiving the authentication request.

Step 905: The HSS sends an authentication response message to the MME. The authentication response message carries the quantity of the access users, or other information.

Step 906: The MME determines whether the quantity of the access users exceeds a preset threshold after receiving the authentication response message, and performs step 907 if the quantity of the access users exceeds a preset threshold, or performs no action if the quantity of the access users does not exceed a preset threshold.

The preset threshold may be set according to a requirement of an actual application, for example, may be set to a quantity of access users that subscribe to the participant operator and a primary operator, or may be set to a value slightly less than a quantity of access users that subscribe to the participant operator and a primary operator. When the quantity of the access users exceeds the preset threshold, it represents that resources may have been almost scarce. Therefore, in this case, the quantity of the access users needs to be updated, to determine whether the resources are scarce in order to accurately control access of a user.

Step 907: The MME sends user management information to the HSS when the MME determines that the quantity of the access users exceeds the preset threshold.

The user management information includes the identification information of the participant operator and invalid user information/valid user information, or other information, and access user information of the participant operator is updated according to the user management information.

The invalid user information is used to indicate a user equipment that has been detached from a network of the participant operator but a user context of the user equipment is still retained in the user access management device, and the valid user information is used to indicate a user equipment attached to the network of the participant operator.

Step 908: The HHS updates access user information of the participant operator according to the user management information after receiving the user management information sent by the MME.

For example, the HHS may determine the corresponding participant operator according to the identification information of the participant operator that is carried in the user management information, and then update the access user information of the determined participant operator according to the invalid user information or the valid user information. For example, the HHS may delete, from an access user information list of the participant operator, a record of access user information corresponding to the invalid user information if the user management information carries the invalid user information. For another example, the HHS may delete, from an access user information list of the participant operator, a record other than access user information corresponding to the valid user information if the user management information carries the valid user information.

It should be noted that the user access management device may be another device, such as a CRM. An implementation method of the other device is similar to this method, and is not described in detail herein.

It can be learned from the above that in this embodiment, a user access management device may perceive whether a quantity of access users exceeds a threshold, and proactively provide user management information to the user access management device when the quantity of the access users exceeds the threshold, where the user management information includes identification information of a participant operator and invalid user information/valid user information such that the user information management device updates access user information of the participant operator according to the user management information in order to ensure that user information, such as a quantity of access users, stored in the user information management device can be consistent with a quantity of actual access users in a shared network. Therefore, the user information management device can subsequently control access of a user based on the quantity of the access users. That is, accuracy of controlling a quantity of access users can be improved by means of the solution such that network resources can be fully used, and normal access of a user is ensured, thereby greatly improving network performance.

Embodiment 11

In addition, this embodiment of the present disclosure further provides a user information management device of a shared network. The user information management device of a shared network may include a memory configured to store data, a transceiving interface configured to send and receive data, and a processor.

The processor is configured to acquire user management information from a user access management device, where the user management information includes identification information of a participant operator and invalid user information/valid user information, and then update access user information of the participant operator according to the user management information.

For example, the processor may be further configured to delete, from an access user information list of the participant operator, a record of access user information corresponding to the invalid user information, or the processor may be further configured to delete, from an access user information list of the participant operator, a record other than access user information corresponding to the valid user information.

The access user information list of the participant operator is used to record access user information of the participant operator.

The processor may acquire the user management information in multiple manners. For example, when perceiving that a quantity of access users exceeds a preset threshold, the user information management device may instruct the user access management device to report the user management information, or the user information management device may inform the user access management device of a quantity of access users, and the user access management device reports the user management information to the user information management device when perceiving that the quantity of the access users exceeds a preset threshold. The preset threshold may be set according to a requirement of an actual application, for example, may be set to a quantity of access users that subscribe to the participant operator and a primary operator, or may be set to a value slightly less than a quantity of access users that subscribe to the participant operator and a primary operator, which is not described in detail herein.

The processor may be further configured to receive, using the transceiving interface, an authentication request that is initiated by the user access management device according to an access request sent by a user equipment, where the authentication request carries the identification information of the participant operator, determine, according to the identification information of the participant operator, the participant operator to which the user equipment belongs, and determine a quantity of access users of the participant operator, send, using the transceiving interface, a notification to multiple access management devices that carry a service of the participant operator when the quantity of the access users exceeds a preset threshold, where the notification instructs the access management device to report user management information, and receive, using the transceiving interface, the user management information sent by the multiple access management devices.

Alternatively, the processor may be further configured to receive, using the transceiving interface, an authentication request that is initiated by the user access management device according to an access request sent by a user equipment, where the authentication request carries the identification information of the participant operator, determine, according to the identification information of the participant operator, the participant operator to which the user equipment belongs, and determine a quantity of access users of the participant operator, send, using the transceiving interface, an authentication response message to the user access management device, where the authentication response message carries the quantity of the access users, and receive, using the transceiving interface, the user management information sent by the access management device, where the user management information is sent by the access management device when the quantity of the access users exceeds a preset threshold.

For specific implementations of the foregoing operations, refer to the foregoing embodiments. Details are not described herein.

The user information management device can also achieve beneficial effects that can be achieved in the embodiments of the present disclosure. For details, refer to the foregoing embodiments. Details are not described herein.

Embodiment 12

Corresponding to Embodiment 11, this embodiment of the present disclosure further provides a user access management device, which may include a memory configured to store data, a transceiving interface configured to send and receive data, and a processor.

The processor is configured to receive, using the transceiving interface, an access request sent by a user equipment, where the access request carries a user identifier, determine, according to the user identifier, a participant operator to which the user equipment belongs, send an authentication request to a user information management device according to the access request using the transceiving interface, where the authentication request carries identification information of the participant operator such that the user information management device determines, according to the identification information of the participant operator, the participant operator to which the user equipment belongs, and determines a quantity of access users of the participant operator, receive, using the transceiving interface, a notification that is sent by the user information management device when the user information management device determines that the quantity of the access users exceeds a preset threshold, where the notification instructs the access management device to report user management information, and send the user management information to the user information management device using the transceiving interface such that the user information management device updates access user information of the participant operator according to the user management information.

For specific implementations of the foregoing operations, refer to the foregoing embodiments. Details are not described herein.

The user access management device can also achieve beneficial effects that can be achieved in the embodiments of the present disclosure. For details, refer to the foregoing embodiments. Details are not described herein.

Embodiment 13

This embodiment of the present disclosure further provides a user access management device, which may include a memory configured to store data, a transceiving interface configured to send and receive data, and a processor.

The processor is configured to receive, using the transceiving interface, an access request sent by a user equipment, where the access request carries a user identifier, determine, according to the user identifier, a participant operator to which the user equipment belongs, send an authentication request to a user information management device according to the access request using the transceiving interface, where the authentication request carries identification information of the participant operator such that the user information management device determines, according to the identification information of the participant operator, the participant operator to which the user equipment belongs, and determines a quantity of access users of the participant operator, receive, using the transceiving interface, an authentication response message returned by the user information management device, where the authentication response message carries the quantity of the access users, and send user management information to the user information management device using the transceiving interface when the quantity of the access users exceeds a preset threshold such that the user information management device can update access user information of the participant operator according to the user management information.

For specific implementations of the foregoing operations, refer to the foregoing embodiments. Details are not described herein.

The user access management device can also achieve beneficial effects that can be achieved in the embodiments of the present disclosure. For details, refer to the foregoing embodiments. Details are not described herein.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random access memory (RAM), a magnetic disk, or an optical disc.

The user management method of a shared network, and the corresponding device and system that are provided in the embodiments of the present disclosure are described in detail above. The principle and implementation manners of the present disclosure are described in this specification through specific examples. The description about the embodiments of the present disclosure is merely provided to help understand the method and core ideas of the present disclosure. In addition, a person of ordinary skill in the art can make modifications to the present disclosure in terms of the specific implementation manners and application scopes according to the ideas of the present disclosure. Therefore, the content of specification shall not be construed as a limit to the present disclosure.

What is claimed is:

1. A user management method of a shared network, comprising:
   acquiring, by a user information management device, user management information from a user access management device, wherein the user management information comprises identification information of a participant operator and one of invalid user information and valid user information, wherein the invalid user information is used to indicate a user equipment that has been detached from a network of the participant operator but a user context of the user equipment is still retained in the user access management device, and wherein the valid user information is used to indicate a user equipment attached to the network of the participant operator; and
   updating, by the user information management device, access user information of the participant operator according to the user management information, and
   wherein acquiring the user management information comprises either:
   receiving an authentication request that is initiated by the user access management device according to an access request sent by a user equipment, wherein the authentication request carries the identification information of the participant operator; determining, according to the identification information of the participant operator, the participant operator to which the user equipment belongs; determining a quantity of access users of the participant operator; sending a notification to the user access management device that carries a service of the participant operator when the quantity of the access users exceeds a preset threshold; and receiving the user management information from the user access management device; or
   receiving an authentication request that is initiated by the user access management device according to an access request sent by a user equipment, wherein the authentication request carries the identification information of the participant operator; determining, according to the identification information of the participant operator, the participant operator to which the user equipment belongs; determining a quantity of access users of the participant operator; sending an authentication response message to the user access management device, wherein the authentication response message carries the quantity of the access users; and receiving the user management information from the user access management device when the quantity of the access users exceeds a preset threshold.

2. The method according to claim 1, wherein updating the access user information of the participant operator comprises deleting, from an access user information list of the participant operator, a record of access user information corresponding to the invalid user information, wherein the access user information list of the participant operator is used to record the access user information of the participant operator.

3. The method according to claim 1, wherein updating the access user information of the participant operator comprises deleting, from an access user information list of the participant operator, a record other than access user information corresponding to the valid user information, wherein the access user information list of the participant operator is used to record the access user information of the participant operator.

4. A user information management device of a shared network, comprising:
  a memory configured to store data;
  a transceiving interface coupled to the memory and configured to send and receive data; and
  a processor coupled to the memory and configured to:
    acquire user management information from a user access management device,
  wherein the user management information comprises identification information of a participant operator and one of invalid user information and valid user information, wherein the invalid user information is used to indicate a user equipment that has been detached from a network of the participant operator but a user context of the user equipment is still retained in the user access management device, and wherein the valid user information is used to indicate a user equipment attached to the network of the participant operator; and
    update access user information of the participant operator according to the user management information, and
  wherein the processor is configured to acquire the user management information by either:
    receiving an authentication request that is initiated by the user access management device according to an access request sent by a user equipment wherein the authentication request carries the identification information of the participant operator; determining, according to the identification information of the participant operator, the participant operator to which the user equipment belongs; determining a quantity of access users of the participant operator; sending a notification to the user access management device that carries a service of the participant operator when the quantity of the access users exceeds a preset threshold; and receiving the user management information from the user access management device; or
    receiving an authentication request that is initiated by the user access management device according to an access request sent by a user equipment, wherein the authentication request carries the identification information of the participant operator; determining, according to the identification information of the participant operator, the participant operator to which the user equipment belongs; determining a quantity of access users of the participant operator; sending an authentication response message to the user access management device, wherein the authentication response message carries the quantity of the access users; and receiving the user management information from the user access management device when the quantity of the access users exceeds a preset threshold.

5. The user information management device according to claim 4, wherein the processor is further configured to delete, from an access user information list of the participant operator, a record of access user information corresponding to the invalid user information, wherein the access user information list of the participant operator is used to record the access user information of the participant operator.

6. The user information management device according to claim 4, wherein the processor is further configured to delete, from an access user information list of the participant operator, a record other than access user information corresponding to the valid user information, wherein the access user information list of the participant operator is used to record the access user information of the participant operator.

7. A communication system, comprising:
  a user information management device configured to:
    acquire user management information from a user access management device, wherein the user management information comprises identification information of a participant operator and one of invalid user information and valid user information, wherein the invalid user information is used to indicate a user equipment that has been detached from a network of the participant operator but a user context of the user equipment is still retained in the user access management device, and wherein the valid user information is used to indicate a user equipment attached to the network of the participant operator; and
    update access user information of the participant operator according to the user management information, and
  wherein the user information management device is configured to acquire the user management information by either:
    receiving an authentication request that is initiated by the user access management device according to an access request sent by a user equipment, wherein the authentication request carries the identification information of the participant operator; determining, according to the identification information of the participant operator, the participant operator to which the user equipment belongs; determining a quantity of access users of the participant operator; sending a notification to the user access management device that carries a service of the participant operator when the quantity of the access users exceeds a preset threshold; and receiving the user management information from the user access management device; or
    receiving an authentication request that is initiated by the user access management device according to an access request sent by a user equipment, wherein the authentication request carries the identification information of the participant operator; determining, according to the identification information of the participant operator, the participant operator to which the user equipment belongs; determining a quantity of access users of the participant operator; sending an authentication response message to the user access management device, wherein the authentication response message carries the quantity of the access users; and receiving the user management information from the user access management device when the quantity of the access users exceeds a preset threshold.

8. The communication system according to claim 7, further comprising the user access management device coupled to the user information management device and configured to:
   receive the access request from the user equipment, wherein the access request carries a user equipment identifier;
   determine, according to the user equipment identifier, a participant operator to which the user equipment belongs;
   send the authentication request to the user information management device according to the access request;
   receive the notification from the user information management device; and
   send the user management information to the user information management device after the notification is received.

9. The communication system according to claim 7, further comprising the user access management device coupled to the user information management device and configured to:
   receive the access request from the user equipment, wherein the access request carries a user equipment identifier;
   determine, according to the user equipment identifier, a participant operator to which the user equipment belongs;
   send the authentication request to the user information management device according to the access request;
   receive the authentication response message from the user information management device; and
   send the user management information to the user information management device when the quantity of the access users exceeds the preset threshold.

10. The communication system according to claim 7, wherein when updating the access user information, the user information management device is further configured to delete, from an access user information list of the participant operator, a record of access user information corresponding to the invalid user information, wherein the access user information list of the participant operator is used to record the access user information of the participant operator.

11. The communication system according to claim 7, wherein when updating the access user information, the user information management device is further configured to delete, from an access user information list of the participant operator, a record other than access user information corresponding to the valid user information, wherein the access user information list of the participant operator is used to record the access user information of the participant operator.

12. The communication system according to claim 7, wherein the user information management device comprises a home subscriber server.

13. The communication system according to claim 7, wherein the user access management device comprises a mobility management entity.

14. The communication system according to claim 7, wherein the user access management device comprises a customer relationship management device.

\* \* \* \* \*